US 7,818,368 B2

(12) United States Patent
Yang et al.

(10) Patent No.: US 7,818,368 B2
(45) Date of Patent: Oct. 19, 2010

(54) SYSTEM AND METHOD FOR DOWNLOADING CONTENT

(75) Inventors: You-kyoung Yang, Seoul (KR); Min-woo Nam, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 986 days.

(21) Appl. No.: 11/540,713

(22) Filed: Oct. 2, 2006

(65) Prior Publication Data
US 2007/0078928 A1 Apr. 5, 2007

(30) Foreign Application Priority Data
Sep. 30, 2005 (KR) ................ 10-2005-0092206

(51) Int. Cl.
*G06F 15/16* (2006.01)
(52) U.S. Cl. ................ 709/203; 709/217; 709/219
(58) Field of Classification Search ........ 709/203, 709/217, 219
See application file for complete search history.

(56) References Cited

U.S. PATENT DOCUMENTS

| 6,816,724 | B1 * | 11/2004 | Asikainen | ............ 455/414.1 |
| 6,865,555 | B2 * | 3/2005 | Novak | ............ 705/59 |
| 2003/0065802 | A1 * | 4/2003 | Vitikainen et al. | ............ 709/231 |
| 2003/0115294 | A1 | 6/2003 | Hoang | |
| 2003/0149975 | A1 * | 8/2003 | Eldering et al. | ............ 725/34 |
| 2004/0148572 | A1 | 7/2004 | Nakanishi et al. | |
| 2006/0059267 | A1 * | 3/2006 | Cugi et al. | ............ 709/230 |
| 2006/0236325 | A1 * | 10/2006 | Rao et al. | ............ 719/315 |

FOREIGN PATENT DOCUMENTS

| JP | 2000-032428 A | 1/2000 |
| JP | 2000-278731 A | 10/2000 |
| JP | 2002-171493 A | 6/2002 |
| JP | 2002-304321 A | 10/2002 |
| JP | 2004-086249 A | 3/2004 |
| JP | 2004-287471 A | 10/2004 |
| JP | 2005-176074 A | 6/2005 |
| KR | 10-2002-0012872 A | 2/2002 |
| KR | 2002-0012872 A | 2/2002 |
| KR | 10-2002-0035571 A | 5/2002 |
| KR | 2002-0094027 A | 12/2002 |
| KR | 10-2003-0060900 A | 7/2003 |
| KR | 2003-0079807 A | 10/2003 |
| KR | 10-2005-0095484 A | 9/2005 |
| WO | WO 01/63482 A2 | 8/2001 |
| WO | WO 02/071266 A1 | 9/2002 |
| WO | WO 03/056821 A1 | 7/2003 |

* cited by examiner

*Primary Examiner*—Salad Abdullahi
*Assistant Examiner*—El Hadji Sall
(74) *Attorney, Agent, or Firm*—Sughrue Mion, PLLC

(57) ABSTRACT

Systems and methods for downloading content are provided in which a client device determines content to be downloaded and a downloading order of the content to request a downloading profile for the content, and a server device generates the downloading profile in accordance with a request for the downloading profile from the client device, allowing the client device to download the content in accordance with the generated downloading profile, and transmits an end message to the client device if the downloading is completed.

28 Claims, 8 Drawing Sheets

SYSTEM AND METHOD FOR DOWNLOADING CONTENT

CROSS-REFERENCE TO RELATED APPLICATION

This application claims priority from Korean Patent Application No. 10-2005-0092206 filed on Sep. 30, 2005 in the Korean Intellectual Property Office, the entire disclosure of which is incorporated herein by reference.

BACKGROUND OF THE INVENTION

1. Field of the Invention

Apparatus, systems and methods consistent with the present invention relate to downloading content, and more particularly content downloading in which a large amount of content, such as high definition (HD) content, is efficiently downloaded in accordance with a user's preference and the completion of the content downloading is reported to a user.

2. Description of the Prior Art

A video on demand (VOD) service provides video information requested by a user in real time. The VOD service is referred to as a customized video data service or a VOD reference system. The VOD service is a bidirectional service that does not receive a program in a unidirectional manner through the existing public network broadcasting or cable TV system, but receives desired content at a desired time in accordance with a subscriber's request. In addition, the VOD service provides various functions of play, stop, pause, fast forward, fast rewind, and playback at an arbitrary position. Examples of systems that use the VOD service include a high-speed backbone network, an access network, a set top box, and a multimedia database management system (DBMS). The high-speed backbone network connects a video server to a connection network. The access network connects the high-speed backbone network to the set top box. The set top box plays compressed digital video and audio that is transmitted by the video server, and sends the user's request to the video server. A large, optimized database storing video data and audio data is established in the video server in order to provide the video data or the audio data in real time. VOD may also be used in other applications, such as remote-control medical treatment, remote-control education, home banking, home shopping, and telecommunications.

Meanwhile, with the spread of digital broadcasting, demand for high definition (HD) content is increasing. However, current network bandwidth is insufficient for transmitting a large amount of HD content, which may be encoded at 8-10 megabits per second (Mbps). Spread of very high speed digital subscriber lines (VDSL) is at an initial stage in Korea, while asymmetric digital subscriber line (ADSL) networks are being established in other countries. Under the circumstances, it is predicted that it will take significant time to ensure sufficient quality of service (QoS) to allow a broadband network to transmit the HD content in real time to homes, and to stream the HD content at the actual speed of the network. Commercial downloading services have several problems because it takes a lot of time (12 hours in the case of 3 gigabytes (GB)) to download a large amount of HD content. Many methods for transmitting large amounts of content have been suggested to solve such problems.

Examples of the methods include a broadcasting Push VOD method based on a broadcasting network and a VOD method based on reserved downloading in an internet protocol (IP) network. The broadcasting Push VOD method has limitation in spread of service due to a limited frequency resource and a lack of customized content. Also, the above methods have different transmission networks. That is, the broadcasting network is unidirectional and has a broad transmission bandwidth for large-sized data while the IP network is bidirectional and has a narrow data transmission bandwidth. The VOD method based on reserved downloading in the IP network will mainly be discussed.

A representative example of the VOD method based on reserved downloading based on the IP network includes Korean Patent Unexamined Publication No. 2003-0075967 entitled "A VOD system Based on Reserved Downloading and a Service Method Thereof." This related art VOD service will now be described in brief with reference to FIG. 1.

First, a user accesses a VOD server through an external computer system connected to a network. The user inputs information such as subscriber information, the number of times the content will be used, and a payment method, and reserves content downloading (S10). The VOD server generates a reserved code according to the information input by the user, and provides the generated reserved code to the subscriber (S20). At this time, the generated reserved code is matched with content use information, and is then stored in the VOD server. If the user intends to download the reserved content, the user externally calls an internal telephone terminal connected to a VOD set top box to actuate the VOD set top box (S30). The VOD set top box is supplied with a subscriber ID and the reserved code from the user (S40), and transmits them to the VOD server to request downloading of the reserved content (S50). The VOD server extracts the content use information from the reserved code to transmit corresponding content to a content supply server and commands downloading of the reserved content (S60). The content supply server encodes the corresponding content to include the content use information previously supplied from the user and downloads the corresponding content in the corresponding VOD set top box (S70). The VOD set top box stores the downloaded content in a storage medium (S80). Then, the subscriber identifies the stored content use information, and decodes the content to play the same.

However, the conventional VOD service has several problems.

First, only content reserved in advance can be downloaded, and downloading starts by the user directly inputting an ID and a reserved code with VOD set top box each time content is downloaded. For this reason, the conventional VOD service has little advantage in comparison with a pull downloading method based on immediate downloading. Also, the conventional VOD service is inconvenient in that the process takes a long time, and user information has to be input several times.

Second, there is no consideration for content downloading time and order. In the Push VOD method based on the broadcasting network, content is linearly downloaded in accordance with a content update order designated by a service provider. In the VOD method based on reserved downloading in the IP network, there is no function for adjusting a downloading order of a plurality of content if the content is reserved. For this reason, a problem arises in that the user is required to be in standby state to view desired content until downloading of content positioned prior to the desired content is completed. Moreover, since the content has a large size, the user must remain in a standby state for a long time. This is undesirable and it decreases the probability that the user will purchase the content.

Third, a problem arises in that the completion of the content downloading is not reported to the user. To identify either the time when the user can view desired content or content that can be played currently, the user may be required to check the status of the content downloading numerous times on the set top box, which is inconvenient.

SUMMARY OF THE INVENTION

The present invention provides a system and method for downloading content, whereby a large amount of HD content is efficiently downloaded in accordance with a user's preference via a set top, and the completion of the content downloading is reported to a user.

According to an aspect of the present invention, there is provided a system for downloading content, which includes a server device which provides content; and a client device which is connected to the server device through a network, receives the content, and determines the content to be downloaded and a downloading order of the content to request a downloading profile for the content, and the server device generates the downloading profile in accordance with a request for the downloading profile which is received from the client device, downloads the content to the client device in accordance with the generated downloading profile, and transmits an end message to the client device if the downloading of the content is completed.

The server device may include a web server which provides program information on the content for a predetermined time period through a web page to allow the client device to request the downloading profile, generates the downloading profile by receiving selection information on the content to be downloaded, and downloads order information on the content from the client device a content management server which stores the downloading profile generated by the web server by receiving the downloading profile from the web server and downloading the content to the client device in accordance with the downloading profile; and a messaging server connected to the web server and the content management server, the messaging server receiving an end message, which includes a list of the downloaded content, from the content management server if the downloading is completed, and transmitting the end message to the client device.

The client device may include a set top box which is connected to the web server and the content management server and plays the content downloaded from the content management server through a display device; and a portable terminal which is connected wirelessly to the messaging server via the Internet and receives the end message which includes a list of the downloaded content from the messaging server if the downloading is completed.

In another aspect of the present invention, there is provided a method of downloading content in a system which comprises a server device which provides the content and a client device which is connected to the server device through a network, the server device comprising a web server, a content management server, and a messaging server, and the client device comprising a set top box having a display device, a portable terminal, and a personal computer, the method including: registering, by a service provider, program information on the content for a predetermined time period in the web server; generating a downloading profile of the content stored in the content management server using the program information registered in the web server; downloading the content from the content management server to the set top box in accordance with a downloading profile; and transmitting a downloading complete message to the client device if the downloading is completed.

BRIEF DESCRIPTION OF THE DRAWINGS

The above and other aspects of the present invention will become apparent from the following detailed description of exemplary embodiments taken in conjunction with the accompanying drawings, in which.

DETAILED DESCRIPTION OF THE EXEMPLARY EMBODIMENTS OF THE PRESENT INVENTION

Figure 1:
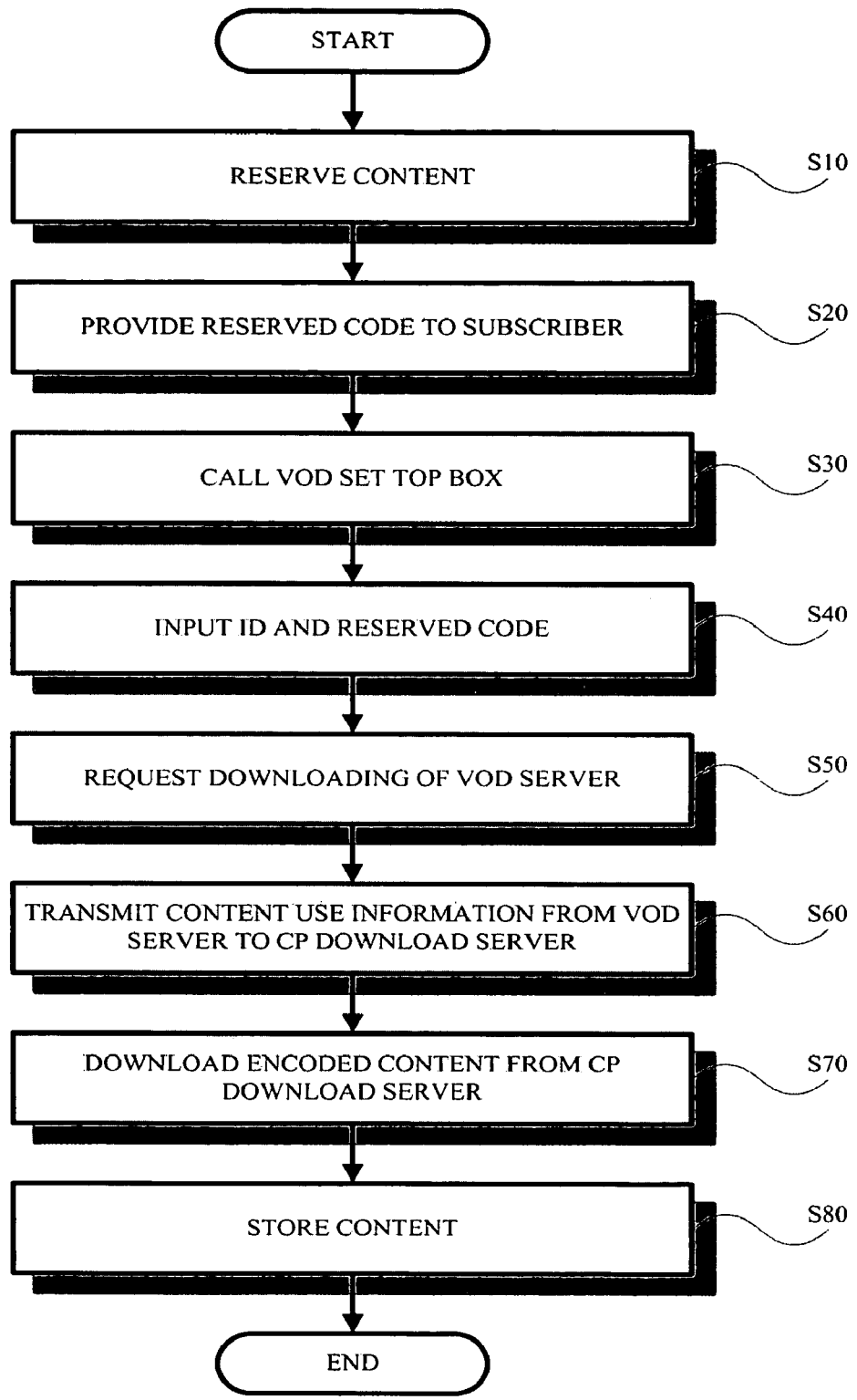
FIG. 1 is a flowchart illustrating a related art VOD service.

Hereinafter, exemplary embodiments of the present invention will be described in detail with reference to the accompanying drawings. The aspects and features of the present invention and methods for achieving the aspects and features will be apparent by referring to the embodiments to be described in detail with reference to the accompanying drawings. However, the present invention is not limited to the exemplary embodiments disclosed hereinafter, but will be implemented in diverse forms. The matters defined in the description, such as the detailed construction and elements, are nothing but specific details provided to assist those of ordinary skill in the art in a comprehensive understanding of the invention, and the present invention is only defined within the scope of appended claims and equivalents thereof. In the entire description of the exemplary embodiments of the present invention, the same drawing reference numerals are used for the same elements across various figures.

Although the scope of the present invention may be applied regardless of the type of content, a method for downloading VOD content will be described in the exemplary embodiments of the present invention that follow.

Figure 2:
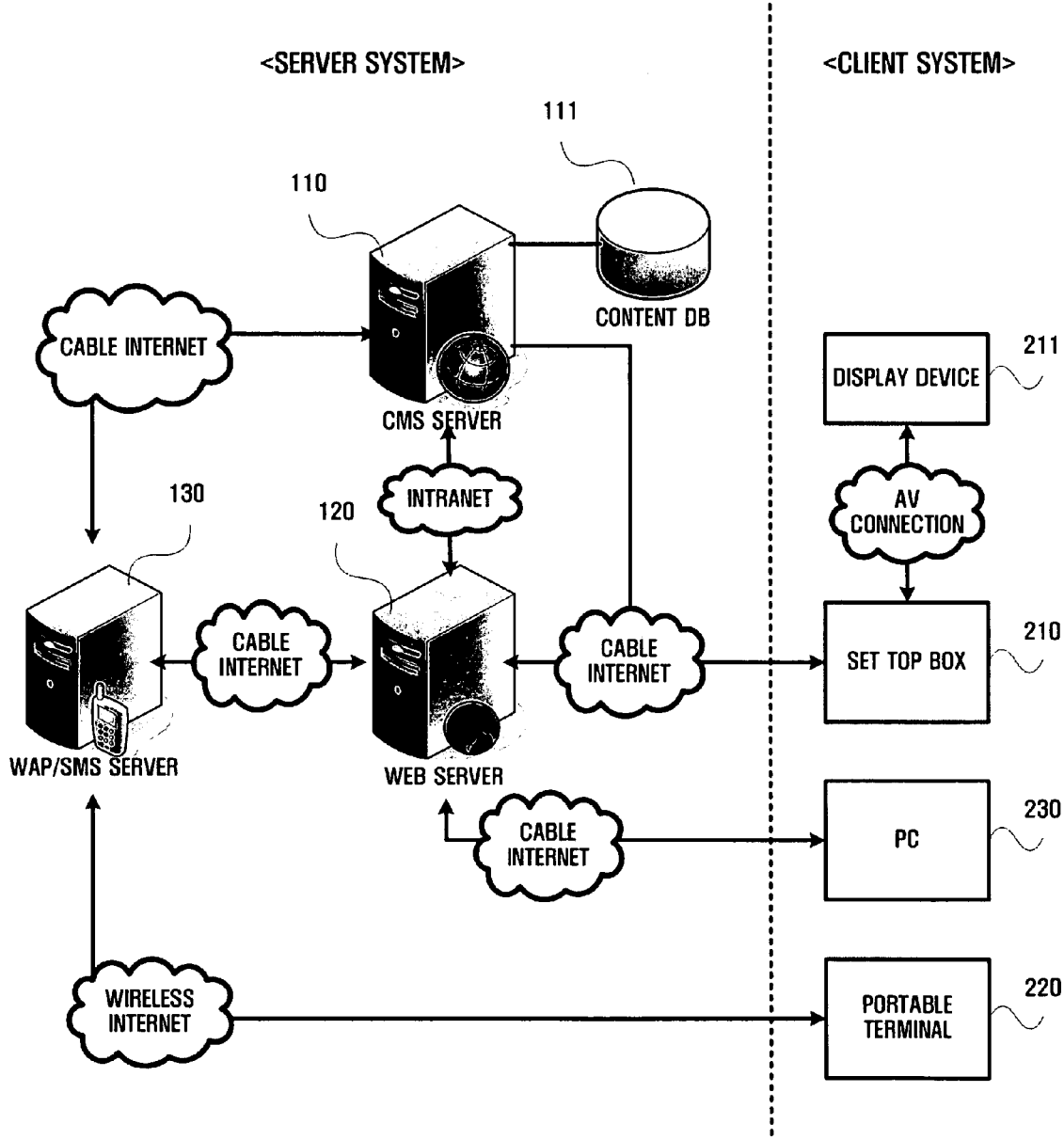
FIG. 2 illustrates a system for downloading content according to an exemplary embodiment of the present invention.

FIG. 2 illustrates a system for downloading content according to an exemplary embodiment of the present invention. Referring to FIG. 2, a server device that provides content and a client device connected to the server device through a network to receive the content will be described in accordance with their functions.

The client device includes a set top box connected to a display device 211 through audio/video (AV) cabling, a portable terminal 220, and a personal computer (PC) 230. The client device requests a downloading profile for the content by inputting selection information on the content to be downloaded, and downloading order information on the content.

The server device includes a content management server 110 having a content database (DB) 111, a web server 120, and a Wireless Application Protocol/Short Messaging Service (WAP/SMS) server 130. The server device generates the downloading profile in accordance with a request for a downloading profile from the client device, and downloads the content in the client device in accordance with the generated downloading profile, and transmits an end message to the client device if downloading is completed.

Functions of the structural elements of the client device according to an exemplary embodiment will be described in detail. The set top box 210 is connected to the web server 120 and the content management server 110 via the Internet, and plays the content downloaded from the content management server 110 through the display device 211. Also, the set top box 210 accesses program information related to content downloading provided from the web server 120 to input selection information on content to be downloaded by the user and downloading order information on the content. The set top box 210 downloads the content from the content management server 110. To this end, the set top box 210 includes a storage medium for storing the downloaded content therein. The storage medium is divided into a user area and a system area. A service provider downloads content in the system area for a user who is subscribed to a downloading service. If downloading is completed, the set top box 210 receives an end message, which includes a list of the downloaded content, and notifies the user of the completion of the download by displaying the list on the display device 211 and/or audibly notifying the user via a speaker, or providing another form of notification.

The portable terminal 220 is wirelessly connected to the WAP/SMS server 130 via the Internet, and receives the end message, which includes the list of the downloaded content, from the WAP/SMS server 130 if downloading is completed. Also, the portable terminal 220 transmits a request for additional downloading of predetermined content from the user to the WAP/SMS server 130 through the end message transmitted thereto. The portable terminal 220 receives a web page from the WAP/SMS server 130 to input selection information on content to be downloaded by the user and downloading order information on the content.

The PC 230 is connected to the web server 120 through the Internet, and provides an auxiliary form of accessing program information on VOD content provided from the web server 120 per predetermined time period to input selection information on content to be downloaded by the user, and downloading order information on the content. In other words, such a function of the PC 230 is also implemented by the display device 211 and the set top box 210 connected via AV cabling.

Functions of the respective servers of the server device according to an exemplary embodiment will be described in detail in the following. The web server 120 provides program information on the content per predetermined time period through the web page to allow selection information on content to be downloaded by the client device to be input, downloads order information on the content, and generates a downloaded content profile in accordance with the selection information and the downloaded order information. The predetermined time period refers to a time period per day, week, and month, and may be set in accordance with the user's selection. The web page includes a web page for the set top box 210, a web page for the PC 230, and a web page for the portable terminal 220. To efficiently download the content and update the status of the profile, the downloading profile generated by the web server 120 is stored in the content management server 110 and the set top box 210. The downloading profiles in the web server 120, the content management server 110, and the set top box 210 are synchronized with one another to commonly share updated content.

The web server 120 serves to receive from the client device preference information on content input through the client device, and information on whether to receive a downloading end message when the user is subscribed to a downloading service.

The content management server 110 receives the downloading profile from the web server 120 to store it therein, and downloads content in the client device in accordance with the downloading profile. Also, the content management server 110 includes the content DB 111 that stores content therein. The content management server 110 serves to search corresponding content from the content DB 111 in accordance with the downloading profile to download the corresponding content in the client device. Furthermore, if the user updates preference information on the content input by the user when the user is subscribed to a downloading service, and information on whether to receive the downloading end message, or if the user updates the selection information and the downloading order information through the web page provided from the web server 120, the content management server 110 implements an update by reflecting the updated information in the downloading profile, and receives downloading status information from the set top box 210 to reflect the status information in the downloading profile even if downloading is completed or stopped.

The WAP/SMS server 130 is connected via a cable to the web server 120 and the content management server via the Internet, and receives the end message, which includes the list of downloaded content, from the content management server 110 to transmit the end message to the client device if downloading is completed. Also, if the user transmits a request message for additional downloading of other predetermined content to the WAP/SMS server 130 using the end message transmitted to the portable terminal 220, the WAP/SMS server 130 transmits the web page for the portable terminal to the portable terminal 220 of the user to allow the user to input selection information on the content to be downloaded and the downloading order information on the content.

In an exemplary embodiment, if the user is subscribed to a Push VOD service, content provided by a VOD service provider is downloaded to the user's set top box. In this case, the user does not need to request downloading of the content every time unlike the existing downloading method. Further, the user is able to use content in the set top box in real time without undergoing a long downloading period. To this end, the VOD service provider provides the set top box having the system area for storing content in the storage medium to the user. The system area is calculated in accordance with the number of types of content and the volume of content to be provided by the service provider. The user, who is supplied with the set top box, connects the set top box to the Internet and the display device, and is subscribed to a service, which is provided by the service provider, through the set top box. After being subscribed to the service, the user can set preference on content per individual, whether to receive the end message if downloading is completed, and auto power-on of the set top box when new content is updated.

Figure 4:
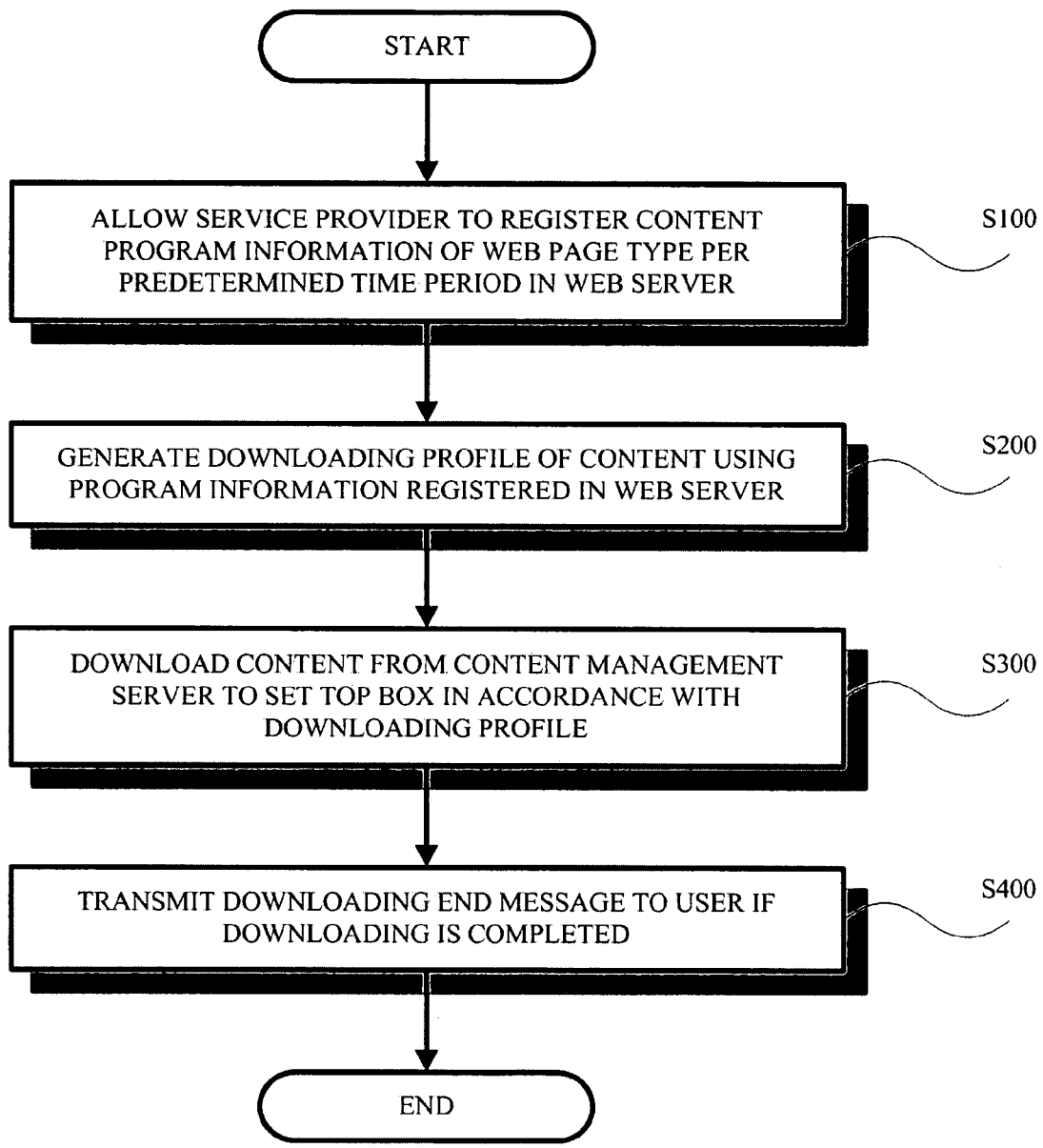
FIG. 4 is a flowchart illustrating a method of downloading content according to an exemplary embodiment of the present invention.

Hereinafter, the flow of the method for downloading content in accordance with an exemplary embodiment of the present invention will be described with reference to FIG. 4. FIG. 4 is a flowchart illustrating a method for downloading content in accordance with an exemplary embodiment of the present invention.

First, if the service provider registers content program information of a web page type per predetermined time period in the web server 120 (S100), the user establishes a downloading profile of content stored in the content management server 110 using the program information registered in the web server 120 (S200). The content is downloaded from the content management server 110 to the set top box 210 in accordance with the downloading profile (S300). If downloading is completed, the end message of downloading is transmitted to the user (S400).

Hereinafter, detailed procedures of each step of the method for downloading content according to an exemplary embodiment of the present invention will be described with reference to FIG. 5 to FIG. 8.

Figure 5:
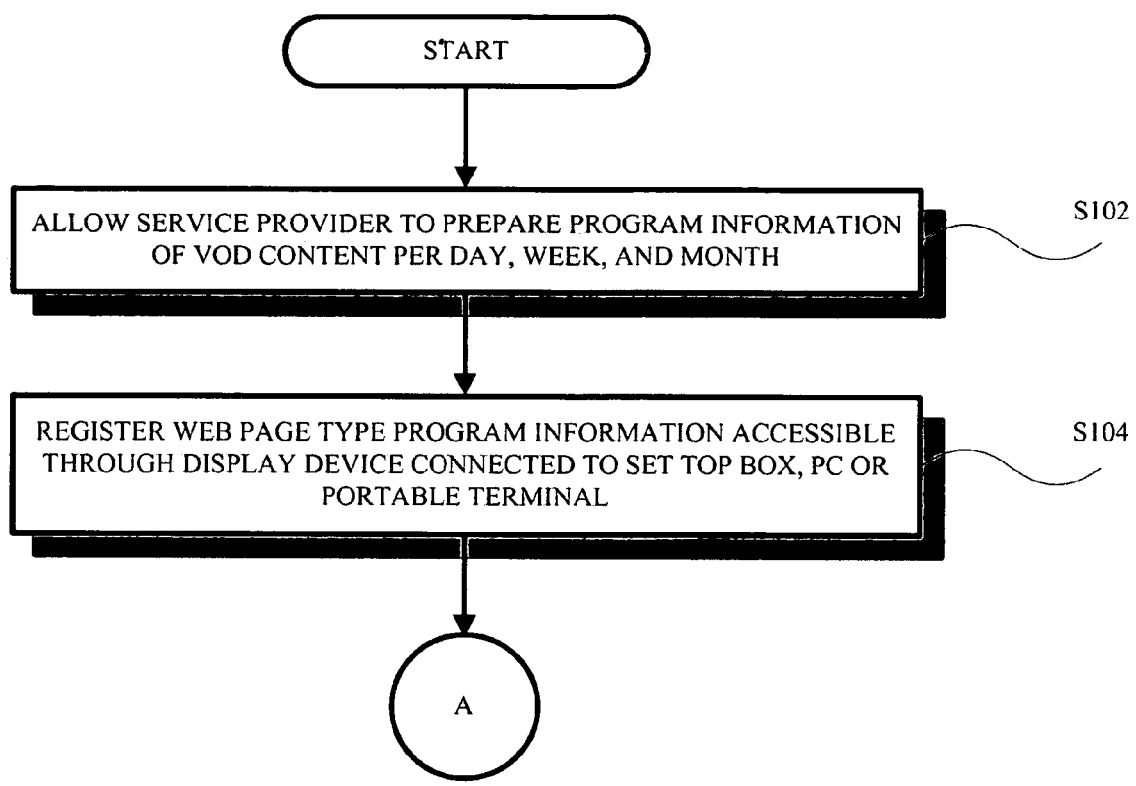
FIG. 5 is a flowchart illustrating a first operation of the method of downloading content according to an exemplary embodiment of the present invention.

FIG. 5 is a flowchart illustrating a first operation of the method for downloading content according to an exemplary embodiment of the present invention. First, the service provider prepares program information on VOD content comprised at constant intervals per day, week, or month (S102), and the user registers the prepared program information in the web server 120 using the web page through the set top box 210, the PC 230, or the portable terminal 220 (S104).

Meanwhile, in the case where the service user does not input information on the downloading profile, the service provider may previously set basic content, metadata for the content, and a basic value of a downloading order for the content, and may store them in the content management server 110.

Figure 6:
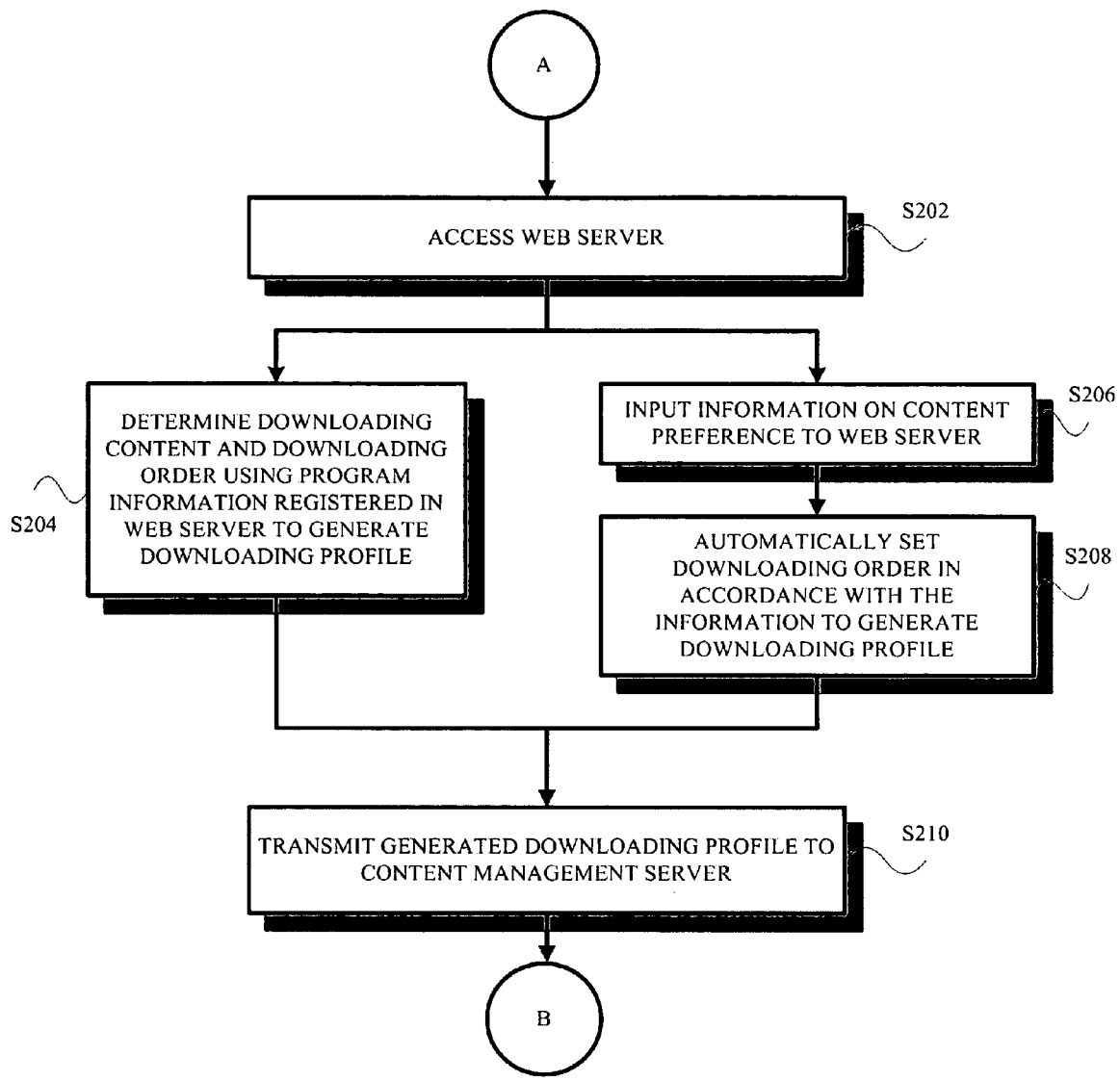
FIG. 6 is a flowchart illustrating a second operation of the method of downloading content according to an exemplary embodiment of the present invention.

FIG. 6 is a flowchart illustrating a second operation of the method for downloading content according to an exemplary embodiment of the present invention. First, the user accesses the web server 120 in which content program information is registered (S202). A downloading profile may be established using the program information. In addition, a profile may be established automatically through the web server 120 regardless of program information if the user inputs preference information on content. In the case of establishing the downloading profile based on program information, the user directly establishes content to be downloaded and a downloading order for the content using the program information registered in the web server 120 to select content suitable for its preference and generate the downloading profile in due order (S204). In the case of automatically establishing the profile regardless of program information, if the user previously inputs the preference information on content in the web server 120 (S206), the web server 120 automatically establishes the downloading order of the content to conform all the content stored in the content management server 110 to information including the user's preference, thereby generating the downloading profile (S208). Then, in both cases, the downloading profile is transmitted to the content management server 110 and registered therein (S210).

Figure 7:
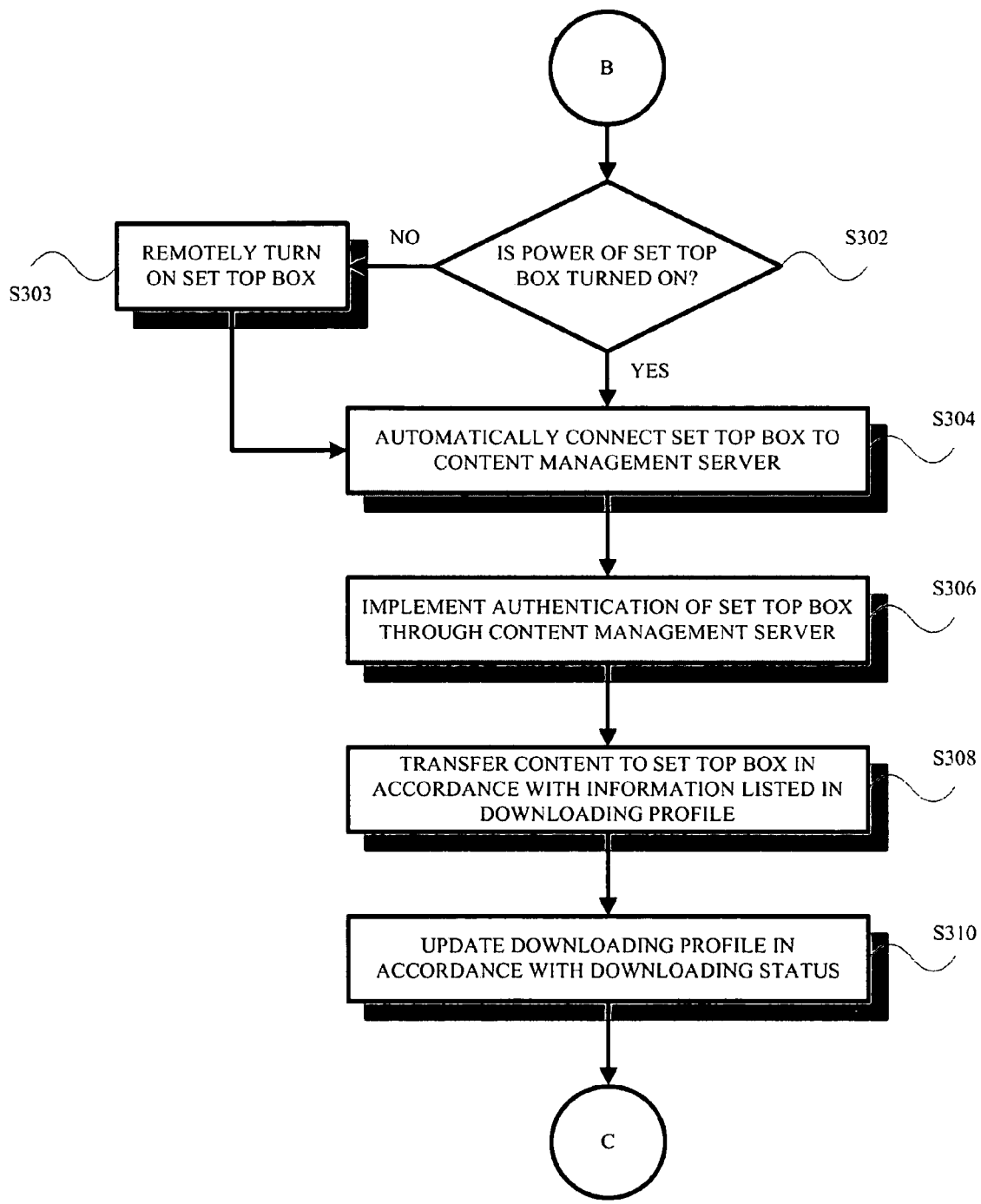
FIG. 7 is a flowchart illustrating a third operation of the method of downloading content according to an exemplary embodiment of the present invention.

FIG. 7 is a flowchart illustrating a third operation of the method for downloading content according to an exemplary embodiment of the present invention. First, it is determined whether the power of the set top box 210 is turned on (S302). If the power of the set top box 210 is turned on, the set top box 210 automatically accesses the content management server 110 (S304). If the power of the set top box 210 is not turned on, the content management server 110 remotely turns the set top box 210 on so that the set top box 210 accesses the content management server 110 (S303). The content management server 110 implements authentication for the set top box 210 (S306), and downloads the content in the set top box 210 in accordance with the content stored in the downloading profile and the downloading order of the content (S308). The downloading profile stored in the content management server 110 is updated in real time in accordance with the downloading status (S310). Thus, downloading of the same content is not repeated at a later time.

Meanwhile, the set top box 210, which has downloaded the content, may transmit the content to a set top box of another user or may receive content another set top box through peer-to-peer (P2P) distribution. In this case, the downloading profile is updated in real time in accordance with the transmission status.

Figure 8:
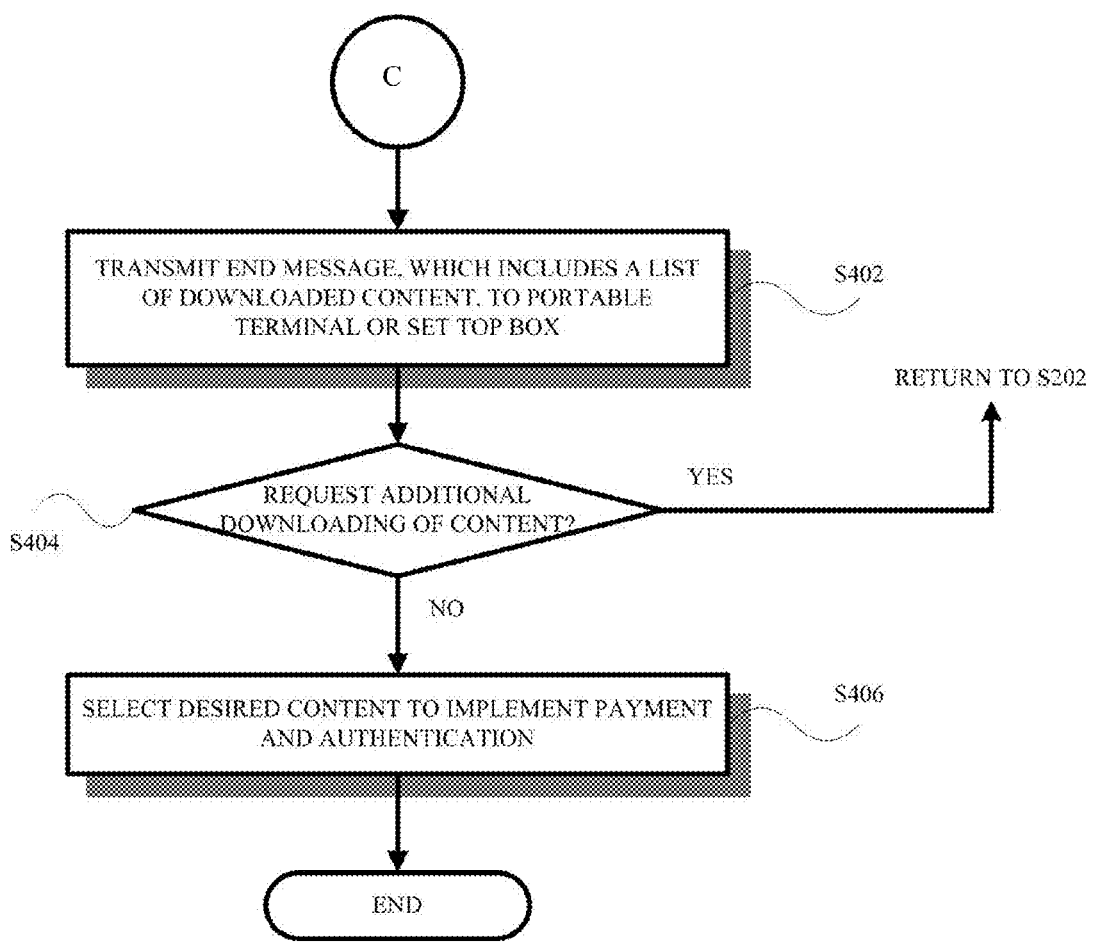
FIG. 8 is a flowchart illustrating a fourth operation of the method of downloading content according to an exemplary embodiment of the present invention.

FIG. 8 is a flowchart illustrating a fourth operation of the method for downloading content according to an exemplary embodiment of the present invention. The end message, which includes the list of the downloaded content, is transmitted to the portable terminal 220 or the set top box 210 (S402). The user determines through the list of the downloaded content whether to request additional downloading of predetermined content (S404). If the request for additional downloading exists, the current operation returns to operation S202. If the request for additional downloading does not exist, the user selects desired content from the content of the list, pays a service fee and implements authentication to use the content (S406).

Meanwhile, if the user pushes a power-off button of the set top box 210 after completely using the downloaded content, the set top box 210 recommends the user to set "standby mode" to stop other functions and to maintain downloading only. If the user selects "complete end," the user checks the downloading status of the content of the set top box 210 to update the content downloading status listed in the content downloading profile stored in the set top box 210.

Figure 3:
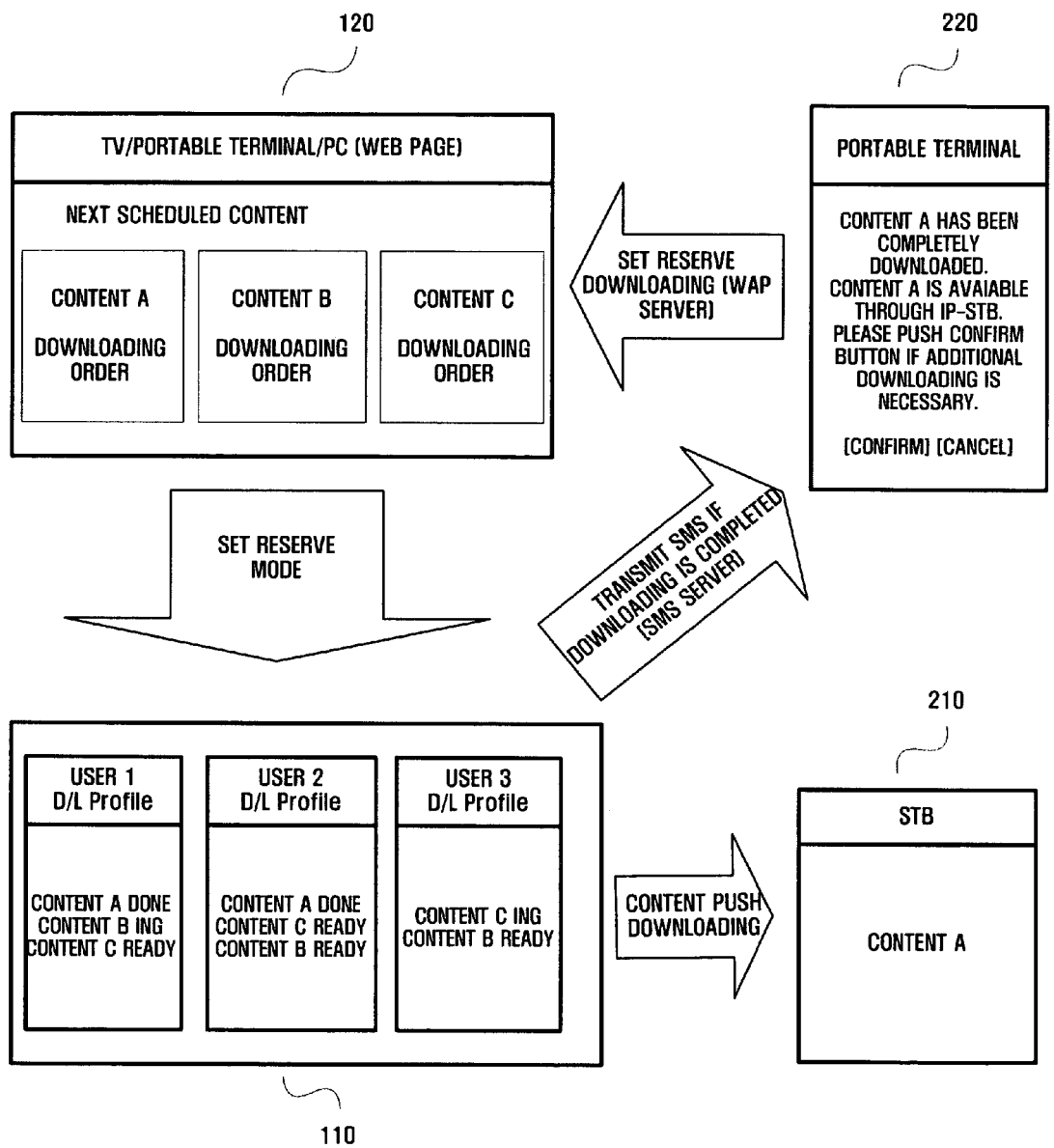
FIG. 3 illustrates the procedure of downloading content according to an exemplary embodiment of the present invention.

Meanwhile, the procedure of downloading content is exemplarily shown in FIG. 3. The procedure of downloading content will be described with reference to FIG. 3. If the user downloads the content, a message indicating that content A has been completely downloaded is displayed in the portable terminal 220 as shown in a right side at the top of FIG. 3. The message may include a message inquiring as to whether downloading of additional content is desired. If the user pushes "confirm" to select additional downloading, the WAP server transmits the web page for the portable terminal, which is received from the web server 120, to the portable terminal 220. The user determines content to be selected and directly sets a downloading order through "scheduled content for next week" displayed in the web page. Then, the user updates the downloading profile.

It is noted from the content displayed in the content management server 110 at a left side of FIG. 3 that the downloading order for detailed content, i.e., content A, content B, and content C is determined, and the order among the content A, the content B, and the content C is set. It is also noted that user 1 sets content in the order of content A, content B, and content C, user 2 in the order of content A, content C, and content B, and user 3 in the order of content C and content B without selecting content A.

If downloading for each user is completed, the content management server 110 sends an end message in a messaging format, such as SMS format, to inform the user that downloading has been completed, or allows the display device 211 connected to the set top box 210 to display an alarm setting window and at the same time output a beep sound. Meanwhile, since user 1 and user 2 have completed downloading of content A, the content A is stored in the storage medium of the set top box 210.

As described above, in the system and method for downloading content, the user can use the content in real time through the set top box without requesting downloading of the content every time unlike the existing downloading method.

Further, since the downloading order is based on the user's content preference, it is possible to provide the user's desired content and reduce the downloading time by departing from the existing linear downloading manner.

Further, since content that the user is interested in is not selected by allowing the user to reserve downloading through the program information on the scheduled content, the service provider can transmit the content preferred by the user, and the user can efficiently use a limited network bandwidth and a limited space of the set top box.

Further, since the user can use content in a timely manner through an alarm function if downloading is completed, it is possible to reduce the inconvenience of having to check through the set top box about whether downloading has been completed.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A system for downloading content, the system comprising:
    a server device which provides content; and
    a client device which is connected to the server device through a network, receives the content, and determines the content to be downloaded and a downloading order of the content to request a downloading profile for the content,
    wherein the server device generates the downloading profile in accordance with a request for the downloading profile which is received from the client device, downloads the content to the client device in accordance with the generated downloading profile, and transmits an end message to the client device if the downloading of the content is completed, wherein the server device comprises:
    a web server which provides program information on the content for a predetermined time period through a web page to allow the client device to request the downloading profile, generates the downloading profile by receiving selection information on the content to be downloaded, and downloads order information on the content from the client device;
    a content management server which stores the downloading profile generated by the web server by receiving the downloading profile from the web server and downloading the content to the client device in accordance with the downloading profile; and
    a messaging server connected to the web server and the content management server, said messaging server receiving an end message, which includes a list of the downloaded content, from the content management server if the downloading is completed, and transmitting the end message to the client device.

2. The system of claim 1, wherein the messaging server is a Wireless Application Protocol/Short Messaging Service (WAP/SMS) server.

3. The system of claim 1, wherein the client device comprises:
    a set top box which is connected to the web server and the content management server, and plays the content downloaded from the content management server through a display device; and
    a portable terminal which is connected wirelessly to the messaging server via the Internet, and receives the end message which includes a list of the downloaded content from the messaging server if the downloading is completed.

4. The system of claim 3, wherein the client device further comprises a personal computer which is connected to the web server via the Internet, accesses program information provided from the web server on the content for a predetermined time period to input selection information and downloads order information.

5. The system of claim 4, wherein the set top box accesses the program information provided from the web server to input the selection information and the downloading order information.

6. The system of claim 4, wherein the portable terminal accesses the program information provided from the web server to input the selection information and the downloading order information.

7. The system of claim 1, wherein the web server is supplied with preference information on the content, which is input through the client device if the client device is subscribed to a downloading service, and information indicating whether reception of a downloading end message is desired.

8. The system of claim 7, wherein the web server automatically generates a downloading profile in accordance with the preference information on the content if the selection information and the downloading order information are not input from the client device.

9. The system of claim 1, wherein the content management server comprises a content database which stores the content therein, and searches for the content in the content database in accordance with the downloading profile to download the content to the client device.

10. The system of claim 1, wherein the content management server updates the preference information on the content input if the client device is subscribed to the downloading service and information as to whether to reception of the downloading end message is desired through the web page provided from the web server, and the content management server reflects the updated preference information and information as to whether to reception of the downloading end message is desired the downloading profile.

11. The system of claim 3, wherein the content management server updates the downloading profile by receiving downloading status information from the client device if downloading of the content is completed or stopped.

12. The system of claim 3, wherein the WAP/SMS server transmits an additional download request message, which requests additional downloading of predetermined content, to the content management server if the portable terminal transmits the additional download request message to the WAP/SMS server using the end message.

13. The system of claim 3, wherein the set top box comprises a storage medium that stores content downloaded from the content management server.

14. The system of claim 3, wherein the set top box receives the end message, which includes a list of the downloaded content, if the downloading is completed, and indicates reception of the end message by outputting the end message to the display device or causing an audible notification to be emitted.

15. The system of claim 1, wherein the content includes a plurality of different on-demand programs, and the server device downloads selected on-demand programs among the plurality of different on-demand programs to the client device in the downloading order, the downloading order and selection of the selected on-demand programs being specified by the downloading profile.

16. A method of downloading content in a system which comprises a server device which provides the content and a client device which is connected to the server device through a network, the server device comprising a web server, a content management server, and a messaging server, and the client device comprising a set top box having a display device, a portable terminal, and a personal computer, the method comprising:

registering, by a service provider, program information on the content for a predetermined time period in the web server;

generating a downloading profile of the content stored in the content management server using the program information registered in the web server;

downloading the content from the content management server to the set top box in accordance with a downloading profile; and transmitting a downloading complete message to the client device if the downloading is completed, wherein the registering the program information comprises:
preparing the program information on the content per day, week, and month; and
registering the program information which is prepared in the web server as a web page to allow access to the program information through the set to box, the personal computer, or the portable terminal, and wherein generating the downloading profile comprises:
accessing the web server.
receiving selection information on the content to be downloaded by the client device and downloading order information on the content using the program information which is registered in the web server, and generating the downloading profile of the content in accordance with the selection information and the downloading order information; and
transmitting the generated downloading profile to the content management server.

17. The method of claim 16, wherein the receiving the selection information comprises generating the downloading profile by inputting preference information on the content to the web server and the web server automatically establishing the downloading order of the content to conform the content stored in the content management server to the preference information which is input.

18. The method of claim 16, wherein the downloading the content from the content management server to the set top box comprises:

determining whether the set top box is turned on;
accessing the content management server by the set top box if the set top box is turned on;
authenticating the set top box by the content management server; and
transferring the content to the set top box from the content management server in accordance with the selection information stored in the downloading profile and the downloading order information.

19. The method of claim 18, wherein the accessing the content management server comprises remotely turning on the set top box by the content management server if the power of the set top box is not turned on.

20. The method of claim 18, further comprising updating the downloading profile stored in the content management server in accordance with a downloading status.

21. The method of claim 16, further comprising:
transmitting the content from the set top box, which has downloaded the content, to another set top box in a peer to peer manner; and
updating the downloading profile in accordance with a status of transmitting the content to the other set top box.

22. The method of claim 16, wherein the transmitting the downloading complete message comprises transmitting an end message, which includes a list of the downloaded content, to the portable terminal or the set top box.

23. The method of claim 22, wherein the transmitting the downloading complete message further comprises:
determining whether additional downloading of a specified content has been requested using the transmitted end message; and
regenerating the downloading profile of the content stored in the content management server using the program information registered in the web server if additional downloading is requested while selecting a desired content among the content of the list to perform a payment and authentication.

24. The method of claim 16, wherein the messaging server is a Wireless Application Protocol/Short Messaging Service (WAP/SMS) server.

25. The method of claim 16, wherein the content includes a plurality of different on-demand programs, and the server device downloads selected on-demand programs among the plurality of different on-demand programs to the client device in the downloading order, the downloading order and selection of the selected on-demand programs being specified by the downloading profile.

26. The system of claim 1, wherein the predetermined time period is a time period per day, week, and month, set by the client device.

27. The method of claim 16, wherein the predetermined time period is a time period per day, week, and month, set by the client device.

28. The method of claim 16, wherein the downloading complete message is sent by the server.

* * * * *